(12) United States Patent
Pan

(10) Patent No.: US 7,388,707 B2
(45) Date of Patent: Jun. 17, 2008

(54) HIGH-RESOLUTION SPATIAL LIGHT MODULATION

(75) Inventor: Shaoher X. Pan, San Jose, CA (US)

(73) Assignee: Spatial Photonics, Inc., Sunnyvale, CA (US)

( * ) Notice: Subject to any disclaimer, the term of this patent is extended or adjusted under 35 U.S.C. 154(b) by 0 days.

(21) Appl. No.: 11/346,803

(22) Filed: Feb. 3, 2006

(65) Prior Publication Data

US 2006/0126153 A1 Jun. 15, 2006

Related U.S. Application Data

(63) Continuation-in-part of application No. 10/974,468, filed on Oct. 26, 2004, now Pat. No. 7,167,298, which is a continuation-in-part of application No. 10/974,461, filed on Oct. 25, 2004, now Pat. No. 7,245,415.

(60) Provisional application No. 60/514,589, filed on Oct. 27, 2003, provisional application No. 60/513,327, filed on Oct. 23, 2003.

(51) Int. Cl.
*G02B 26/00* (2006.01)

(52) U.S. Cl. .................. 359/291; 359/290; 359/292; 359/295

(58) Field of Classification Search ............. 359/290, 359/291, 292, 295, 298
See application file for complete search history.

(56) References Cited

U.S. PATENT DOCUMENTS

| | | | |
|---|---|---|---|
| 6,469,821 B2 | 10/2002 | Bartlett et al. | |
| 6,487,001 B2 | 11/2002 | Greywall | |
| 6,819,469 B1 | 11/2004 | Koba | |
| 6,819,470 B2 | 11/2004 | Meier et al. | |
| 6,870,659 B2 | 3/2005 | Aubuchon | |
| 6,914,711 B2 * | 7/2005 | Novotny et al. | 359/291 |
| 6,992,810 B2 | 1/2006 | Pan et al. | |
| 7,068,417 B2 | 6/2006 | Yan | |
| 7,148,603 B1 | 12/2006 | Garcia et al. | |
| 7,167,298 B2 | 1/2007 | Pan | |
| 7,245,415 B2 | 7/2007 | Pan | |
| 2004/0240033 A1 | 12/2004 | Pan et al. | |
| 2005/0128564 A1 | 6/2005 | Pan | |
| 2007/0122292 A1 | 5/2007 | Etter et al. | |
| 2007/0127110 A1 | 6/2007 | Pan | |
| 2007/0134896 A1 | 6/2007 | Lee et al. | |

* cited by examiner

*Primary Examiner*—David N Spector
(74) *Attorney, Agent, or Firm*—Fish & Richardson P.C.

(57) ABSTRACT

Methods and apparatus for providing a high-resolution spatial light modulator. A spatial light modulator includes a cell that includes: a substrate portion; a first support post and a second support post, each having a top surface; and a micro mirror that includes a hinge member having a first end and a second end. The first end and second end is secured to the top surface of the first support post and the second support post, respectively. The hinge member and the support posts are completely hidden underneath the micro mirror.

26 Claims, 11 Drawing Sheets

HIGH-RESOLUTION SPATIAL LIGHT MODULATION

CROSS-REFERENCE TO RELATED APPLICATIONS

The present application is a continuation-in-part application of and claims priority to U.S. patent application Ser. No. 10/974,468, entitled "High Contrast Spatial Light Modulator And Method", which was filed on Oct. 26, 2004 now U.S. Pat. No. 7,167,298, and which claims the benefit of priority of U.S. Provisional Application No. 60/514,589, filed Oct. 27, 2003. The present application is a continuation-in-part application of U.S. patent application Ser. No. 10/974,461, entitled "High Contrast Spatial Light Modulator", which was filed on Oct. 25, 2004 now U.S. Pat. No. 7,245,415, and which claims the benefit of priority of U.S. Provisional Application No. 60/513,327 filed Oct. 23, 2003. The disclosures of the above applications are incorporated herein by reference in their entirety.

BACKGROUND

The present disclosure relates to spatial light modulators.

In general, a spatial light modulator (SLM) includes an array of cells, each of which includes a micro mirror that can be tilted about an axis and, furthermore, circuitry for generating electrostatic forces that operate to tilt the micro mirror. In addition, a cell typically includes structures that hold and allow the tilting of the micro mirror. In conventional SLMs, there are gaps between cells for accommodating such structures. The cell usually further includes a first structure and a second structure configured to mechanically stop the cell's micro mirror at the "on" position and the "off" position, respectively. These structures are referred to as mechanical stops.

In one implementation, for example, a digital mode of operation for displaying video images, there are two positions at which the micro mirror can be tilted. In an "on" position or state, the micro mirror directs incident light to an assigned pixel of a display. In an "off" position or state, the micro mirror directs incident light away from the assigned pixel. The "on" position can be, for example, 20 degrees from the horizontal in a first direction of rotation about the axis, and the "off" position can be, for example, 15 degrees from the horizontal in the opposite direction.

An SLM implemented as described above generally operates by tilting a selected combination of micro mirrors to selectively project light to display an image on the display. A display that implements SLM technology is typically required to refresh images at high frequencies typical of video applications. Each instant of refreshing can include changing the state of all or some of the micro mirrors. Providing a fast response by the micro mirrors therefore can be crucial to the proper operation of an SLM-based display device. One issue with response time is related to the stiction, i.e., surface contact adhesion, between the lower surface of the mirror and the mechanical stop in contact with the surface. Stiction can cause a delay in the mirror's response or may even prevent the mirror from changing state.

SUMMARY

In one general aspect, the invention features a spatial light modulator, a cell of which includes: a substrate portion; a first support post and a second support post, each having a top surface; and a micro mirror that includes a hinge member having a first end and a second end. The first end and second end is secured to the top surface of the first support post and the second support post, respectively. The hinge member and the support posts are completely hidden underneath the micro mirror.

In another general aspect, the invention features a method of making a spatial light modulator. The method includes: forming a control substrate; forming a first and a second support posts situated on top of the substrate; and forming a micro mirror having a hinge member about which the micro mirror is configured to tilt. The hinge member is implemented in a bottom layer of the micro mirror. The hinge member includes a first end secured to the first support post. The hinge member includes a second end secured to the second support post. The support posts and micro mirror are formed so that the support posts and hinge member is completely hidden beneath the micro mirror.

Particular implementations of the invention can be implemented to realize one or more of the following advantages. Methods and apparatus described in the present specification provide an SLM in which gaps between cells are reduced or minimized. For each cell, structures for holding a micro mirror and for allowing its tilting are completely hidden underneath the micro mirror. There are no structures, for example, conventional walls, used for supporting the micro mirror, that protrude beyond the perimeter of the micro mirror. Gaps between cells of the described SLM, unlike in conventional SLMs, need not accommodate these protruding structures and, hence, can be reduced or minimized. The described SLM can include more cells per unit area and, consequently, generate images having resolutions superior to conventional SLMs.

Methods and apparatus described provide an SLM in which a mechanical feature by which a micro mirror of a cell is tilted can act as a torsional spring that positions the micro mirror in a neutral or flat position in the absence of external forces and, furthermore, that provides torsional forces that aid in overcoming stiction between the micro mirror and a landing tip with which the micro is in contact when the micro mirror is being repositioned from one state to another. Moreover, the mechanical feature can be manufactured to precise dimensions and, hence, can have an exact spring constant. The spring constants of the cells of the described SLM consequently do not vary greatly, which great variance can cause unreliable operation. A mechanical feature that is too thick and have a spring constant that is too high, for example, would not allow its micro mirror to be moved from the neutral position to either the on or off state. A mechanical feature that is too thin and have a spring constant that is too low, on the other hand, may not provide sufficient aid to overcome stiction when the micro mirror is being repositioned from one state to another. The described SLM thus improves reliability of operation.

Furthermore, methods and apparatus described provide an SLM in which gaps between a reflective surface of a micro mirror and an axis about which the micro mirror is tilted is reduced or minimized. For each cell, the mechanical feature by which the mirror is tilted, and which constitutes the axis about which the micro is tilted, is implemented in a bottom layer of the micro mirror. The mechanical feature and the bottom layer can be of a same thickness, which, for reasons described below, can be significantly less than thicknesses typically implemented in conventional SLMs. Having a reduced or minimized gap between the reflective surface and the axis allows the micro mirror to rotate virtually without translation, which is significant because having less translation generally allows greater resolution, as described below. The described SLM can consequently generate images having resolutions superior to conventional SLMs.

The details of one or more embodiments of the invention are set forth in the accompanying drawings and the description below. Other features, aspects, and advantages of the invention will become apparent from the description, the drawings, and the claims.

DETAILED DESCRIPTION

A high contrast SLM in accordance with the invention includes three major portions: a bottom portion, a middle portion, and a top portion. The bottom portion of the SLM includes a substrate, which includes electronic circuitry to control the operation of cells of the SLM. The middle portion of the SLM includes electrodes, vertical landing tips, and support posts for the micro mirror. The upper portion of the SLM includes an array of micro mirrors, in each of which is implemented a torsion hinge about which the micro mirror can be titled. These components of the SLM are further described in the following paragraphs. For ease of exhibition, only one cell of the SLM is depicted.

Figure 1:
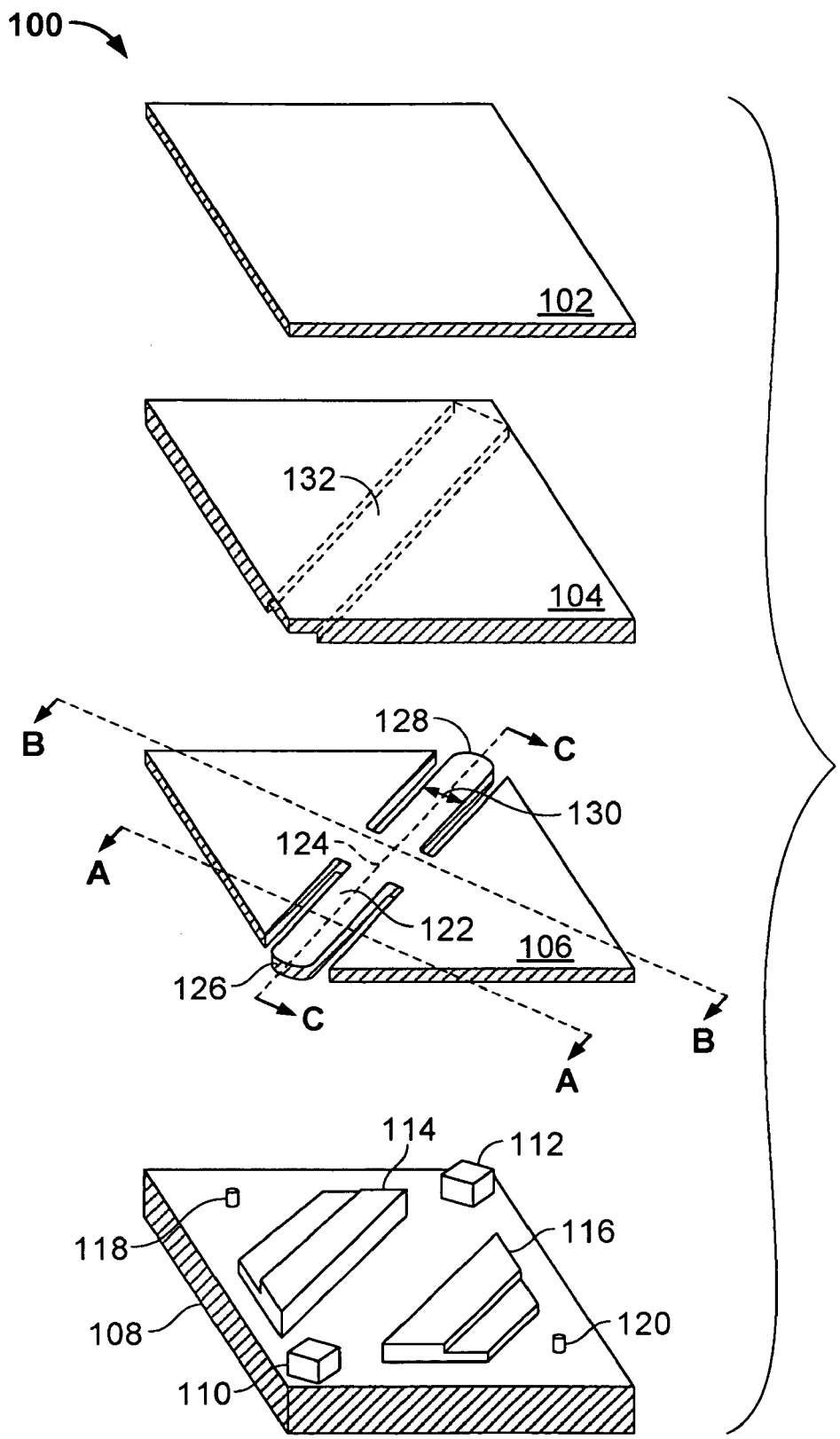
FIG. 1 shows a perspective view of an SLM cell.

FIG. 1 shows a perspective view of an SLM cell 100, which includes one micro mirror (shown as three layers 102, 104, and 106) and a portion of the substrate 108, on which the micro mirror, support posts 110 and 112, electrodes 114 and 116, and vertical landing tips 118 and 120 are situated.

As depicted, the micro mirror has a sandwich structure made of three layers 102, 104, and 106. The micro mirror includes a middle layer 104 made of amorphous silicon, which is sandwiched between an upper reflective layer 102 made of aluminum and a supportive bottom layer 106 made of titanium. Alternatively, each layer can be made of a material that is different than that indicated. The top, middle, and bottom layers 102, 104, and 106 are approximately 600 angstrom, 2000 to 5000 angstrom, and 600 angstrom thick, respectively. Alternatively, each layer can have a thickness different than that indicated. The sandwich structure improves the structural strength of the micro mirror and reduces its deformation due to, for example, temperature gradients.

The top layer 102 of the micro mirror has a top surface that is reflective. This reflective surface acts as one of many mirrors of the SLM. The bottom layer includes a hinge member 122, which includes a longitudinal axis 124, ends 126 and 128 on the longitudinal axis 124, and a width 130 across the longitudinal axis 124. The ends 26 and 128 arc secured to support posts 110 and 112, respectively. The middle layer 104 includes a recess 132 (depicted by the phantom lines) that is configured to accommodate the hinge member 122. In general, the recess 132 provides a gap between a top surface of the hinge member 122 and a bottom surface of the middle layer 104 so that the hinge member 122 does not touch the middle layer 104 even when the micro mirror is tilted (and the hinge member 122 is consequently twisted along its longitudinal axis 124) The extent of the gap depends on the maximum angle at which the micro mirror is operable to tilt and, as described in the commonly owned U.S. patent application Ser. No. 10/974,461, should be no less than $G=0.5 \times W \times SIN(\theta)$, where W is the cross section width of the support post and $\theta$ is the absolute value of the maximum tilt angle of the micro mirror.

With the implementation described above, the natural position of the micro mirror is the position in which the micro mirror is horizontal, i.e. the quiescent state. In this position, the hinge member is not twisted. In a sense, the spring of the hinge member is not loaded.

Also situated on the substrate portion 108 are the electrodes 114 and 116 and vertical landing tips 118 and 120. To tilt the micro mirror so that it rests on one of the vertical landing tips 118 and 120 (which is either the "on" or the "off" state), voltage is usually supplied to and maintained for the appropriate one of the electrodes 114 and 116 so that an electrostatic force that is greater than the spring constant of the hinge member is generated. In such a tilted position, the hinge member 122 is twisted with its center portion being tilted to the angle at which the micro mirror is tilted and its ends 126 and 128 (which are secured to the support posts) remaining horizontal. The spring of the hinge member is thus loaded and there is a torsional spring effect which urges the micro mirror back to its horizontal position. Such potential energy can be used to overcome stiction between the vertical landing tip on which the micro mirror is resting and the bottom surface of the micro mirror.

Optionally, each vertical landing tips 118 and 120 can include a top horizontal member to improve operation. Suitable landing tips are described in commonly owned U.S. patent application Ser. No. 11/297,162 having attorney docket number 18529-015001, entitled "Fast-Response Spatial Light Modulator," which was filed on Dec. 7, 2005.

The electrodes depicted are stepped. That is, each of the electrodes 114 and 116 includes a first level electrode and a second level electrode that is higher than the first level electrode. Alternatively, the electrodes are not stepped and have only one height. Suitable electrodes are described in the commonly owned U.S. patent application Ser. No. 10/974,461.

As mentioned above, the substrate portion 108 includes some of the above-mentioned electronic circuitry. In general, the circuitry provides control voltages to a cell to change a state of the micro mirror of the cell. Optionally, the circuitry can implement a passive addressing scheme, in which a cell of the SLM does not require the inclusion of active circuit components, e.g., drivers. A suitable passive addressing scheme is described in commonly owned U.S. patent application Ser. No. 11/299,232 having attorney docket number 18529-016001, entitled "Passive Micro-Array Spatial Light Modulator," which was filed on Dec. 9, 2005.

Optionally, the cell includes a hinge support frame (not shown), which is generally a frame that has the shape of the cell and that has a same height as the first level electrodes. The hinge support frame is configured to improve the mechanical stability of the support posts and, furthermore, retain the electrostatic potentials local to the cell. A suitable hinge support frame is described in the commonly owned U.S. patent application Ser. No. 10/974,461.

Figure 2:
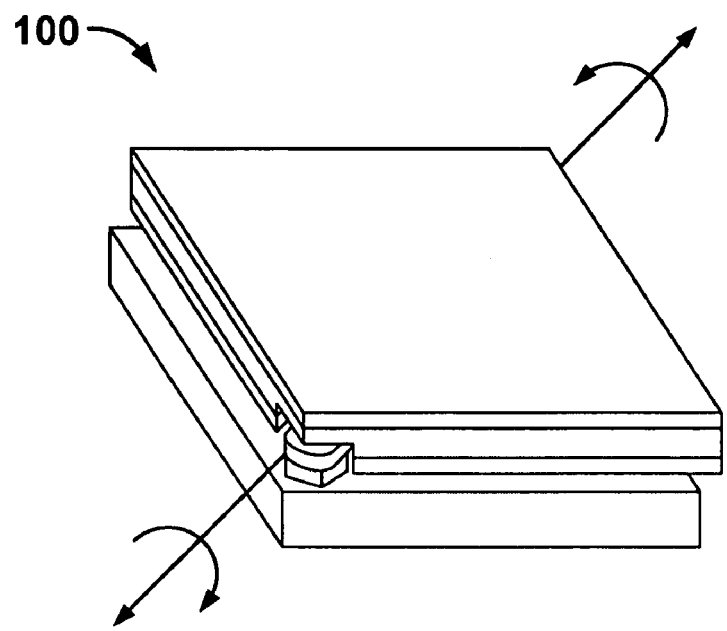
FIG. 2 shows another perspective view of the SLM cell.

FIG. 2 shows a perspective view of the cell 100 described above with its components in place. As can be seen, the axis about which the micro mirror tilts, i.e., longitudinal axis 124, runs diagonal to the edges of the micro mirror. The micro mirror is operable to tilt in a clockwise direction as illustrated by an arrow 202. The micro mirror is also operable to tilt in a counter clockwise direction as illustrated by an arrow 204.

Notably, the support posts 110 and 112 and the hinge member 122 are situated completely underneath the reflective top layer 102 of the micro mirror. That is, these components are situated within the footprint of the reflective top layer of the micro mirror. A gap between adjacent cells, thus, need not accommodate any of these structures.

Moreover, the hinge member 122 is implemented so that the axis 124 about which the micro mirror tilts is located a distance less than the thickness of the micro mirror away from the reflective surface of the top layer 102. Such an arrangement reduces the amount of translation the micro mirror undergoes when tilted to either side of the axis. A gap between adjacent cells, thus, need not accommodate for such a translation of the micro mirror.

Figure 3:
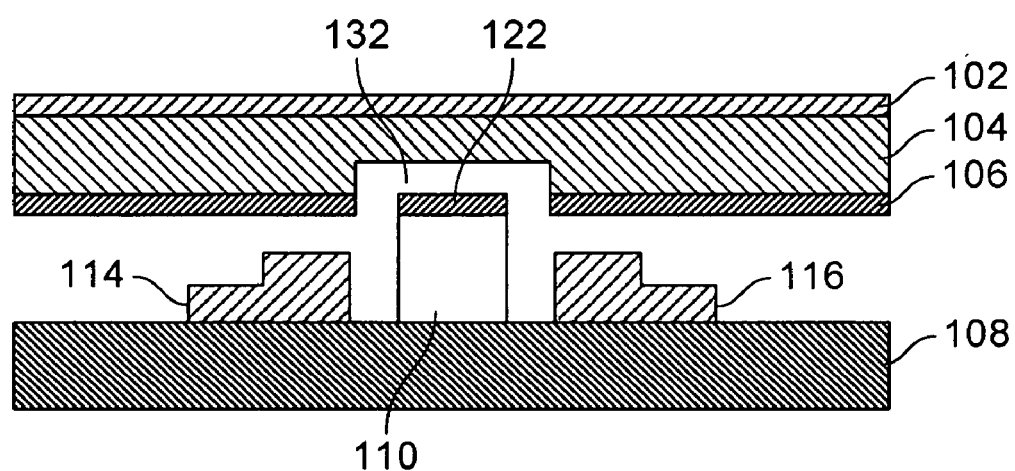
FIG. 3 shows a cross section of the SLM cell.

FIG. 3 shows the cross section A-A. The mirror is shown in its quiescent state. The recess 132 in the middle layer 104 of the micro mirror is depicted, as is the cross section of the hinge member 122 and the cross section of the step electrodes 114 and 116. The support post 110 is also depicted.

Figure 4:
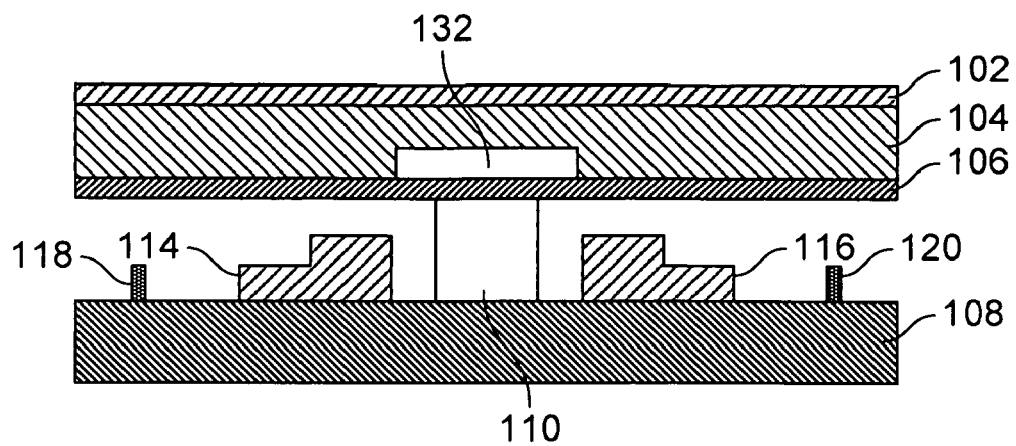
FIG. 4 shows another cross section of the SLM cell.

FIG. 4 shows the cross section B-B. In this cross section view, the recess 132 in the middle layer 104 can be seen. Also visible are the support post 110, the cross section of the step electrodes 114 and 116, and the cross sections of the vertical landing tips 118 and 120. Note that because the cross section cuts across the portion of the hinge member 122 that is attached to the rest of the bottom layer 104, there are no gaps (depicted in FIG. 4) in the cross section of the bottom layer 104 of the micro mirror.

Figure 5:
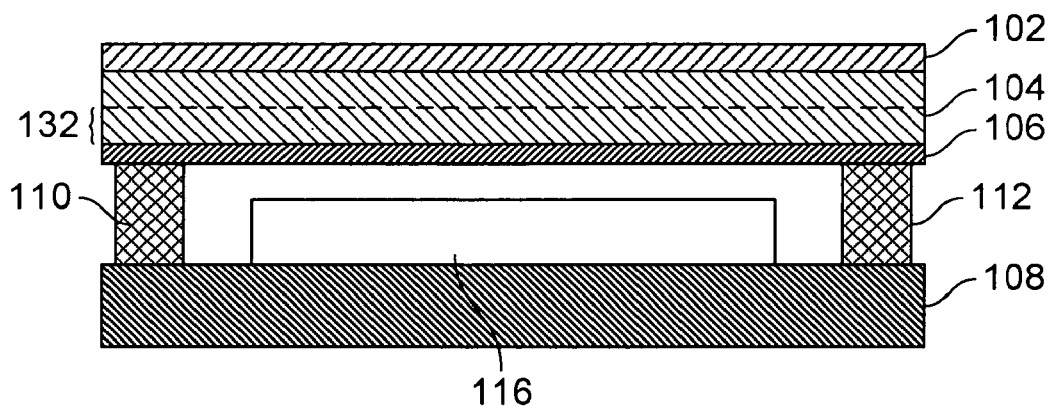
FIG. 5 shows another cross section of the SLM cell.

FIG. 5 shows the cross section C-C. In this cross section view, the step electrode can be seen, as can the cross sections of the support posts. Note that the recess 132 in the middle layer 104 of the micro mirror (depicted by the phantom lines) runs across from left to right in the figure.

Figure 6:
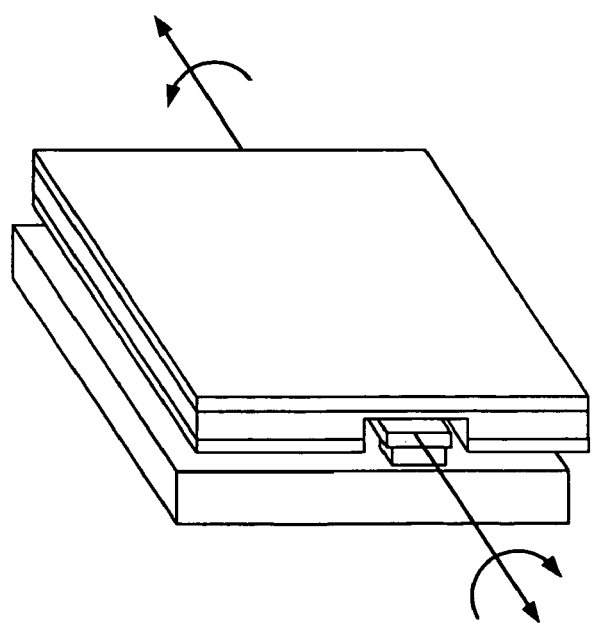
FIG. 6 shows an alternative implementation of the SLM cell.

In the micro mirror described above, the hinge member and, hence, the axis about which the micro mirror tilts is diagonal to edges of the micro mirror. FIG. 6 shows an alternative implementation of the SLM in which the hinge member is orthogonal to edges of the micro mirror. As an alternative or in addition to the diagonally hinged micro mirror described above, the cell depicted can be implemented in the SLM.

Figure 7A:
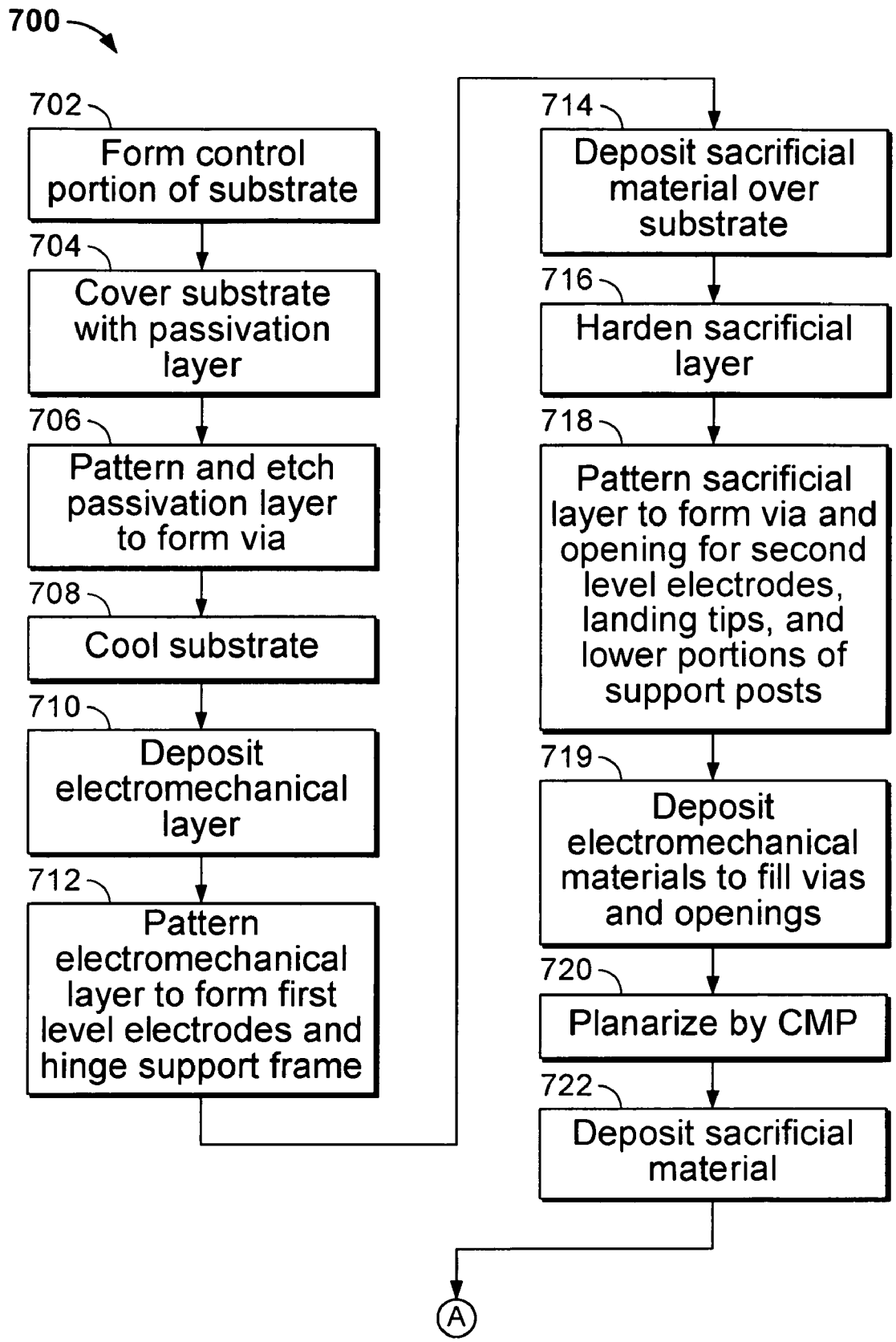
FIGS. 7A and 7B show a method for making an SLM.
Figure 7B:
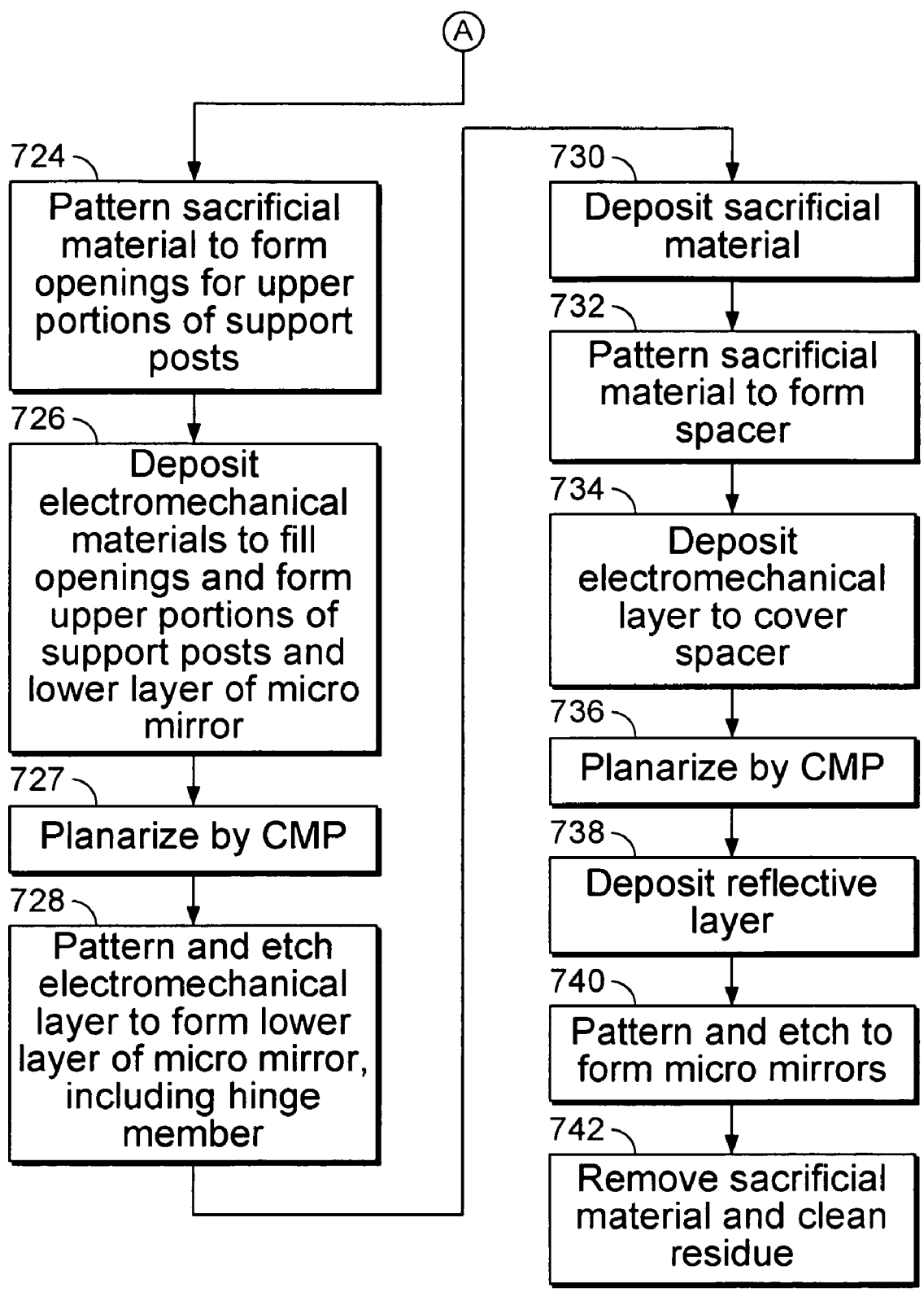

FIGS. 7A and 7B show a method 700 for making the above-described SLM, and FIGS. 8-24 show effects of steps of the method depicted in FIG. 7. For ease of exhibition, only one cell of the SLM is depicted and described.

Figure 8:
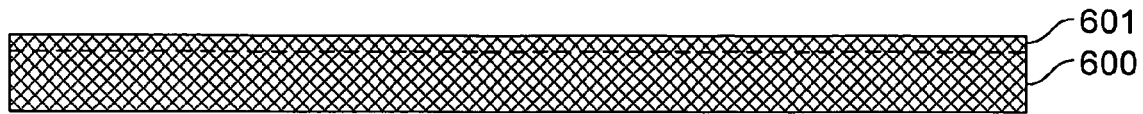
FIGS. 8-24 show effects of steps of the method for making the SLM.

A control silicon substrate 600 is formed using standard CMOS fabrication technology (step 702). In one embodiment, the control circuitry in the substrate includes an array of memory cells, and word-line/bit-line interconnects for communication signals. There are many different methods to make electrical circuitry that performs the addressing function. DRAM, SRAM, and latch devices commonly known all perform an addressing function. Because the area of a typical micro mirror can be relatively large on semiconductor scales (for example, the area of the micro mirror can have an area larger than 100 square microns), complex circuitry can be manufactured beneath micro mirror. Possible circuitry includes, but is not limited to, storage buffers to store time sequential pixel information, and circuitry to perform pulse width modulation conversions. FIG. 8 shows a cross sectional view of the substrate 600.

Figure 9:
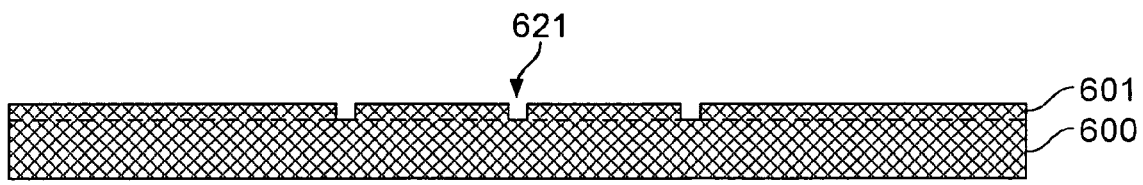

Using a typical CMOS fabrication process, the substrate is covered with a passivation layer 601 such as silicon oxide or silicon nitride (step 704). The passivated substrate 600 is patterned and etched anisotropically (step 706) to form a via 621 connected to the word-line/bit-line interconnects in the addressing circuitry. Alternatively, anisotropic etching of dielectric materials, such as silicon oxides or silicon nitrides, is accomplished with $C_2F_6$ and $CHF_3$ based feedstock and their mixtures with He and $O_2$. One high selectivity dielectric etching process flows $C_2F_6$, $CHF_3$, He, and $O_2$ at a ratio of 10:10:5:2 mixtures at a total pressure of 100 mTorr with inductive source power of 1200 watts and a bias power 600 watts. A typical silicon oxide etch rate can reach 8000 angstroms per minute. The substrate is then cooled with a backside helium gas flow of 20 sccm at a pressure of 2 torr (step 708). FIG. 9 shows the via 621 that is formed.

Figure 10:
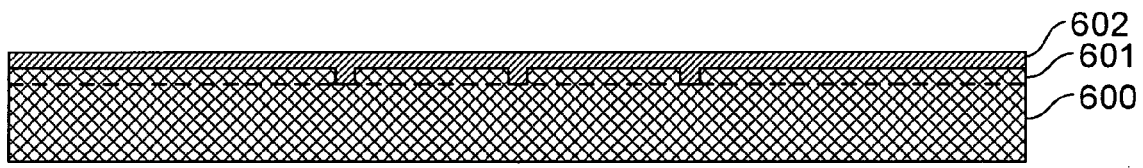
Figure 11:
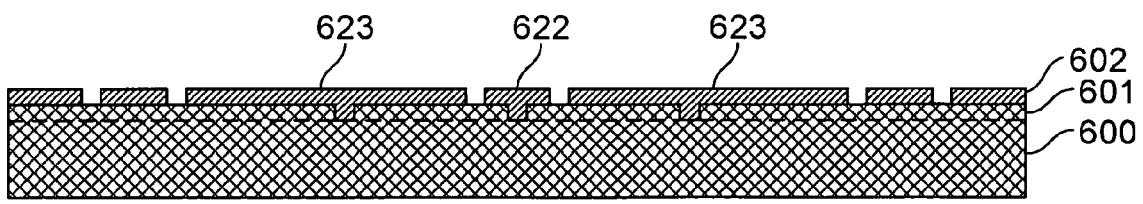

An electromechanical layer 602 is deposited by PVD or PECVD depending on the electromechanical materials selected (step 710). FIG. 10 shows the layer deposited. This electromechanical layer 602 is patterned to define a hinge support frame 622 and a plurality of first level electrodes 623 (step 712). FIG. 11 shows the effect of step 712. The patterning of the electromechanical layer 602 is performed by the following processes. First, a layer of photoresist is spin coated to cover the substrate surface. Then, photoresist layer is exposed to standard photolithography and is developed to form predetermined patterns. The electromechanical layer is etched anisotropically through to form a plurality of vias and openings. Once vias and openings are formed, residues are removed from the surfaces and inside the openings to clean the partially fabricated wafer. This removal is accomplished by exposing the patterned wafer to a 2000 watts of RF or microwave plasma with 2 torr total pressures of a mixture of $O_2$, $CF_4$, and $H_2O$ gases at a ratio of 40:1:5 at about 250° C. for less than five minutes. Finally, the surfaces of the electromechanical layer are passivated by exposure to 2000 watts of RF or microwave plasma with 2 torr pressures of a 3000 sccm of $H_2O$ vapor at about 250° C. temperatures for less than three minutes.

Figure 12:
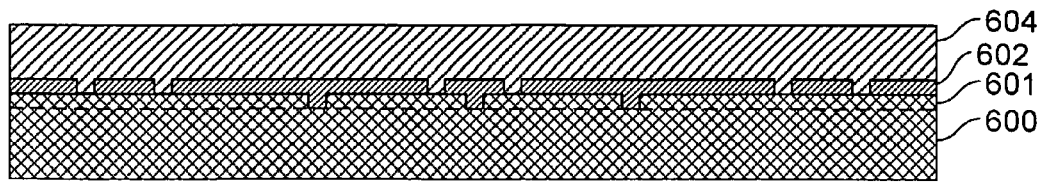

A plurality of second level electrodes, a plurality of vertical landing tips, and a plurality of support posts are formed by the following steps. A micron thick sacrificial material 604 is deposited on the substrate surface, which can be spin coated photoresist or PECVD of organic polymers (step 714). FIG. 12 shows the effect of step 714. The sacrificial layer 604 is hardened by a series of thermal and plasma treatments to transform the structure of the polymer materials from a hydrophobic state to hydrophilic state (step 716). First, the sacrificial layer 604 is exposed to ultraviolet light, then to a $CF_4$ plasma for about three minutes, followed by baking sacrificial layer at about 150° C. for about two hours before exposing the sacrificial layer to oxygen plasma for about one minute. In some cases, implanting the sacrificial layer with KeV energy of silicon, boron, or phosphors ions further hardens the sacrificial layers 604.

Figure 13:
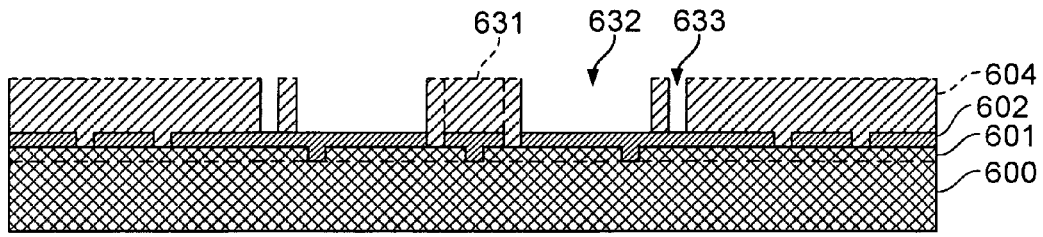
Figure 14:
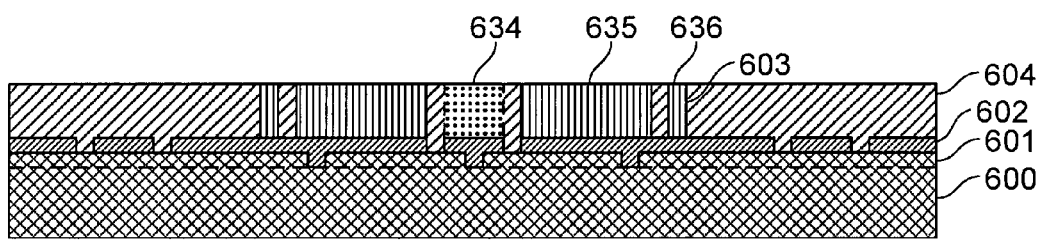

Sacrificial layer 604 is patterned to form a plurality of via and contact openings 632, 633, and 631 for second level electrodes, vertical landing tips, and lower portions of the support posts, respectively (step 718). FIG. 13 shows the effect of step 718. To enhance the adhesion of a subsequent electromechanical layer, the via and contact openings are exposed to a 2000 watts of RF or microwave plasma with 2 torr total pressures of a mixture of $O_2$, $CF_4$, and $H_2O$ gases at a ratio of 40:1:5 at about 250° C. temperatures for less than five minutes. Electromechanical material 603 is then deposited to fill via and contact openings (step 719). The filling is done by either PECVD or PVD depending on the materials selected. For the materials selected from the group consisting of aluminum, titanium, tungsten, molybdenum, their alloys, PVD is a common deposition method in the semiconductor industry. For the materials selected from the group consisting of silicon, polysilicon, silicide, polycide, tungsten, their combinations, PECVD is chosen as a method of deposition. The partially fabricated wafer is further planarized by CMP to a predetermined thickness slightly less than one micron (step 720). FIG. 14 shows the effect of steps 719 and 720. The second level electrodes 635, vertical landing tips 636, and lower portions of the support posts 634 are thus formed.

Figure 15:
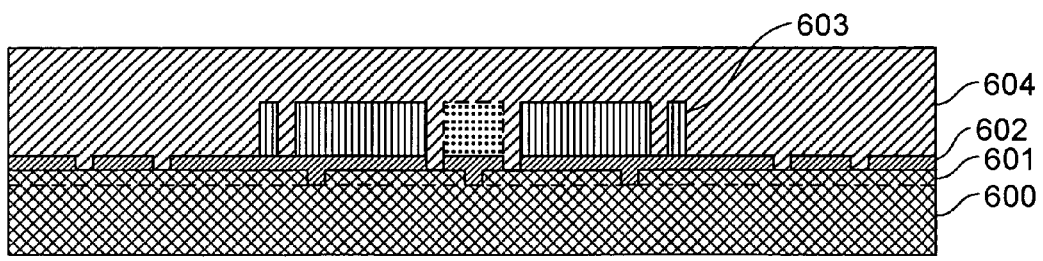
Figure 16:
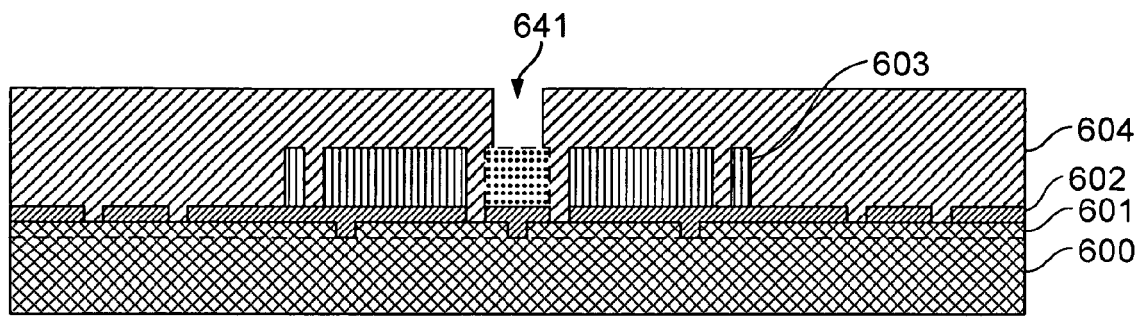
Figure 17:
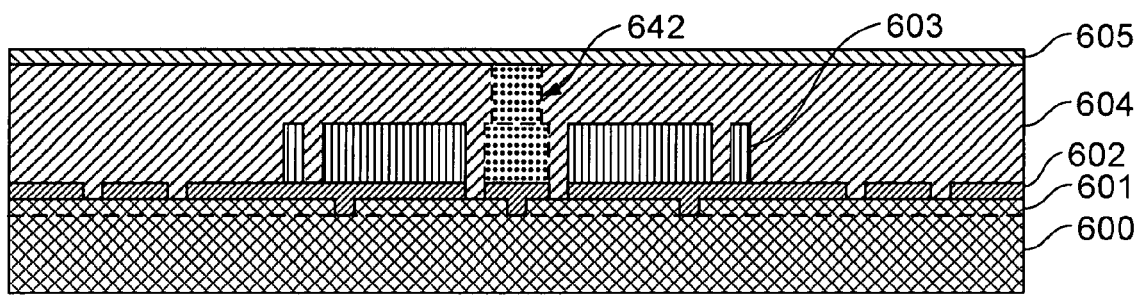

After the CMP planarization, another layer of sacrificial materials 604 is spin coated on the blanket surface to a predetermined thickness and hardened (step 722). FIG. 15 shows the effect of step 722. The sacrificial layer 604 is patterned to form a plurality of contact openings 641 for the upper portion of the support posts (step 724). FIG. 16 shows the effect of step 724. Electromechanical materials are deposited to fill vias to form the upper portions 642 of the support posts and, furthermore, to form a bottom layer 605 of the micro mirror, i.e., the layer that includes the hinge members (step 726). The bottom layer 605 is then planarized by CMP to a predetermined thickness (step 727). The thickness of electromechanical layer 605 formed here defines the thickness of hinge member and the mechanical performance of the mirror. FIG. 17 shows the effect of steps 726 and 727.

The electromechanical layer deposited can be amorphous silicon, which deposition and subsequent CMP can be more precisely controlled than can etching to achieve more exactly a target thickness. (With conventional SLMs, in which the layer at issue is typically made from single crystal silicon, one cannot deposit and polished. Rather, because of temperature constraints, one must etch the layer to achieve a target thickness.)

Figure 18:
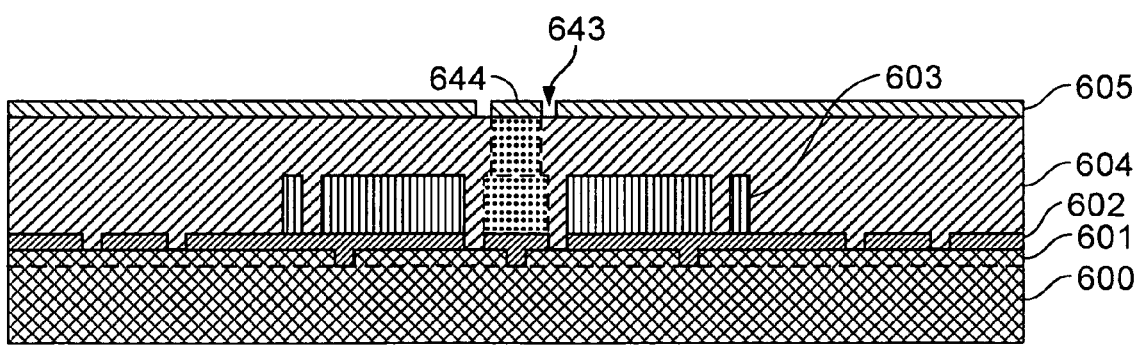
Figure 19:
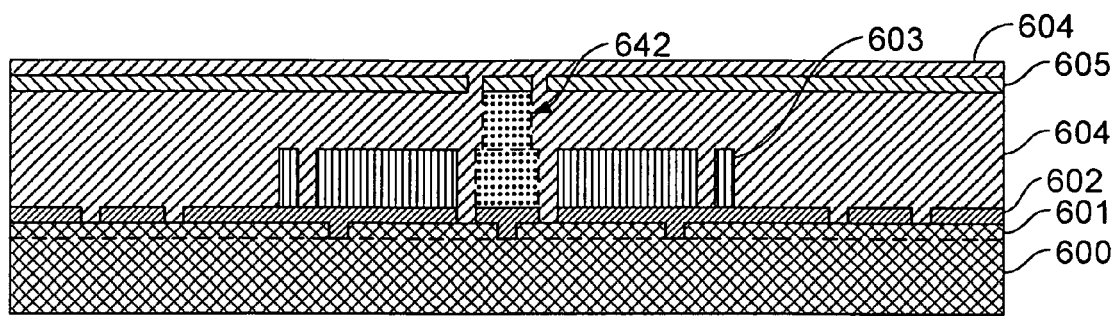
Figure 20:
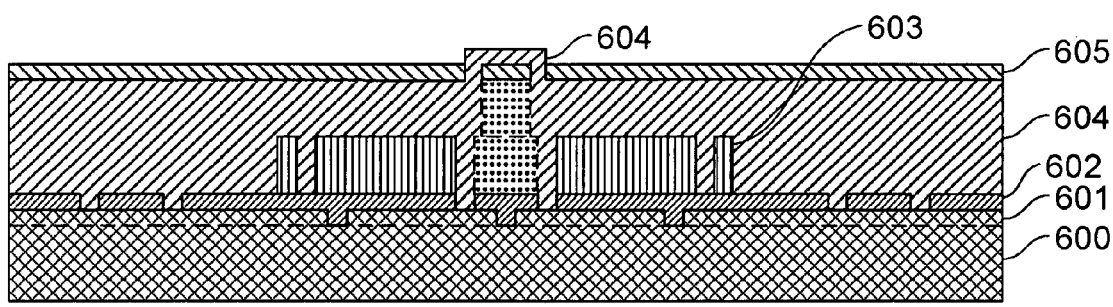

The bottom layer is patterned and etched anisotropically to form a hinge member 644 in the bottom layer of the micro mirror (step 728). FIG. 18 shows the effect of step 728. More sacrificial materials 604 are deposited to fill the openings 643 surrounding each hinge member and to form a thin layer 604 with predetermined thickness on the surface (step 730). FIG. 19 shows the effect of step 730. The thickness of the layer 604 defines the depth of the recess in the middle layer of the micro mirror, i.e., the extent of the spacing above each hinge member 106. The sacrificial layer 604 is then patterned to form a sacrificial spacer above the hinge member 644 (step 732). FIG. 20 shows the effect of step 732. As discussed above, the air gap G in the recess needs to be high enough to accommodate the tilting of mirror plate 103 without touching the support posts 105. With an implementation in which each mirror in the array can rotate at the maximum 15° in each direction, and in which the width of the support post 105 is 1.0 micron, the air gap spacing G in the recess should be larger than 0.13 microns.

Figure 21:
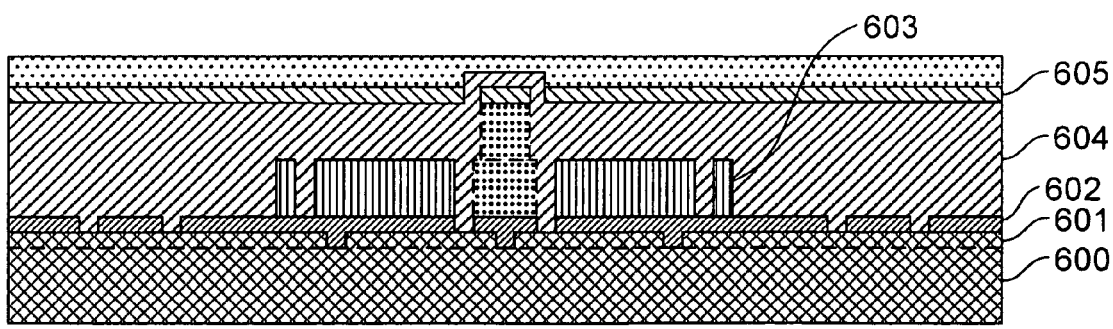

More electromechanical materials, for example, amorphous silicon, are deposited to cover the sacrificial spacer (step 734). The newly deposited layer is optionally planarized by CMP to a predetermined thickness (step 736). FIG. 21 shows the effect of steps 734 and 736. In one implementation, the thickness of the micro mirror form thus far is between 0.3 microns to 0.5 microns.

Figure 22:
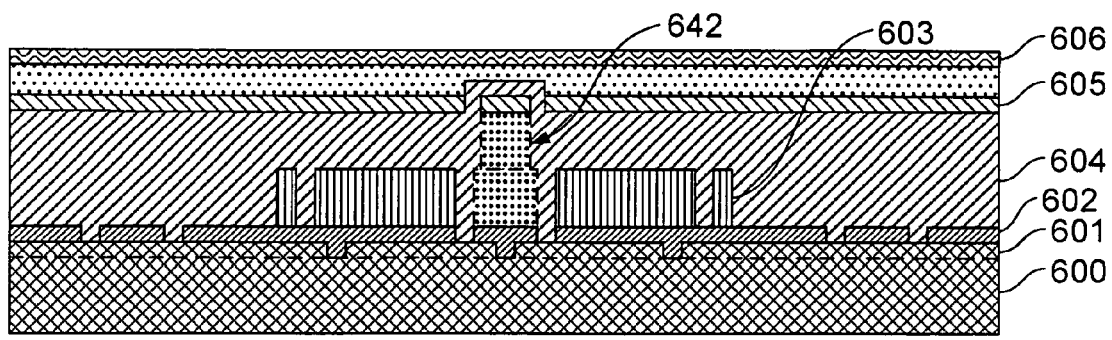
Figure 23:
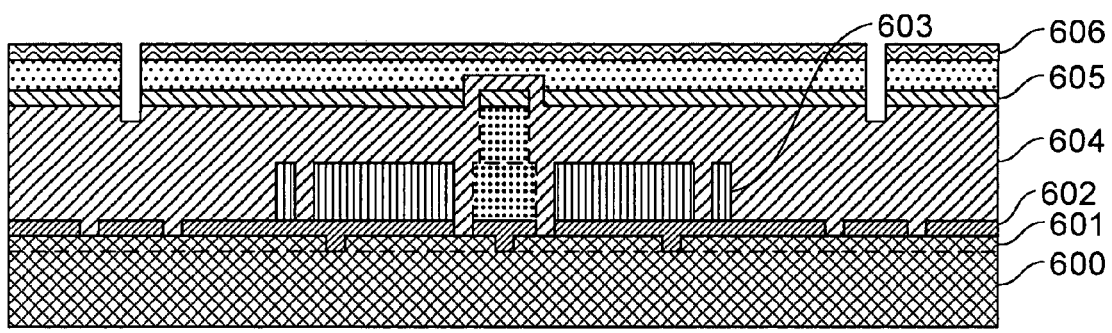

If the electromechanical material is aluminum or its metallic alloy, the reflectivity of mirror is high enough for most display applications. For some other electromechanical materials or for other applications, the reflectivity of the mirror surface may be enhanced by deposition of a reflective layer 606 having a thickness of approximately 600-400 angstroms or less (step 738). The electromechanical material can be selected from the group consisting of aluminum, gold, their alloys, and combinations. FIG. 22 shows the effect of step 738. The reflective surface 606 of electromechanical layer is then patterned and etched anisotropically through to form a plurality of individual mirrors (step 740). FIG. 23 shows the effect of step 740.

Figure 24:
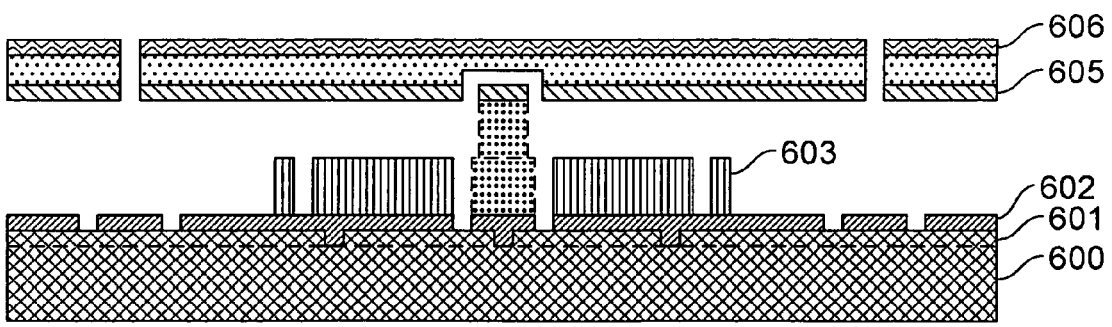

The remaining sacrificial materials 604 are removed and residues are cleaned through a plurality of air gaps between each individual mirrors in the array to form a functional micro-mirror array based spatial light modulation (step 742). FIG. 24 shows the effect of step 742.

Optionally, additional steps can be performed before delivering a functional spatial light modulator for a video display application. For example, after reflective surface 606 of electromechanical layer 605 is patterned and etched anisotropically through to form a plurality of individual mirrors, more sacrificial materials 604 can be deposited to cover the surface of the fabricated wafer. With its surface protected by a layer of sacrificial layer 604, the fabricated wafer goes through common semiconductor packaging processes to form individual device dies. In a packaging process, the fabricated wafer is partially sawed before separated into individual dies by scribing and breaking. The spatial light modulator device die is attached to the chip base with wire bonds and interconnects before striping the remaining sacrificial materials 604 and its residues in the structures. In one embodiment, the cleaning is accomplished by exposing the patterned wafer to a 2000 watts of RF or microwave plasma with 2 torr total pressures of a mixture of $O_2$, $CF_4$, and $H_2O$ gases at a ratio of 40:1:5 at about 250° C. for less than five minutes. Finally, the surfaces of electromechanical and metallization structures are passivated by exposing to a 2000 watts of RF or microwave plasma with 2 torr pressures of a 3000 sccm of $H_2O$ vapor at about 250° C. temperatures for less than three minutes.

The SLM device die can be further coated with an anti-stiction layer inside the opening structures by exposure to a PECVD of fluorocarbon at about 200° C. for less than five minutes before plasma cleaning and electro-optical functional testing. Finally, the SLM device can be hermetically sealed with a glass window lip and sent to bum-in process for reliability and robust quality control.

Figure 25:
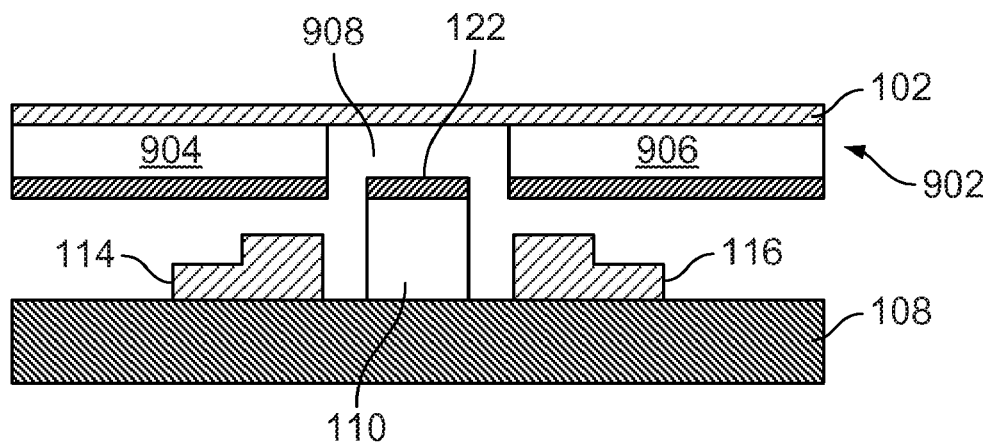
FIGS. 25-27 show cross sections of alternative SLM implementations Like reference numbers and designations in the various drawings indicate like elements.
Figure 26:
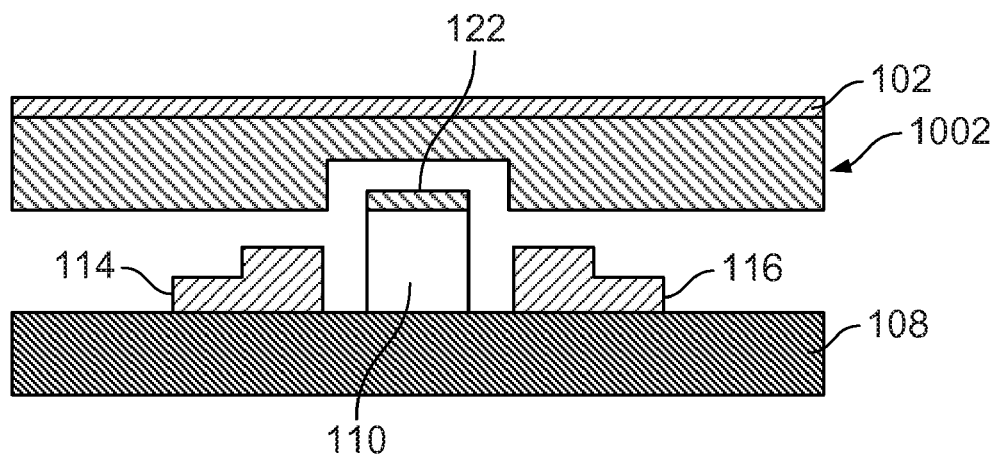
Figure 27:
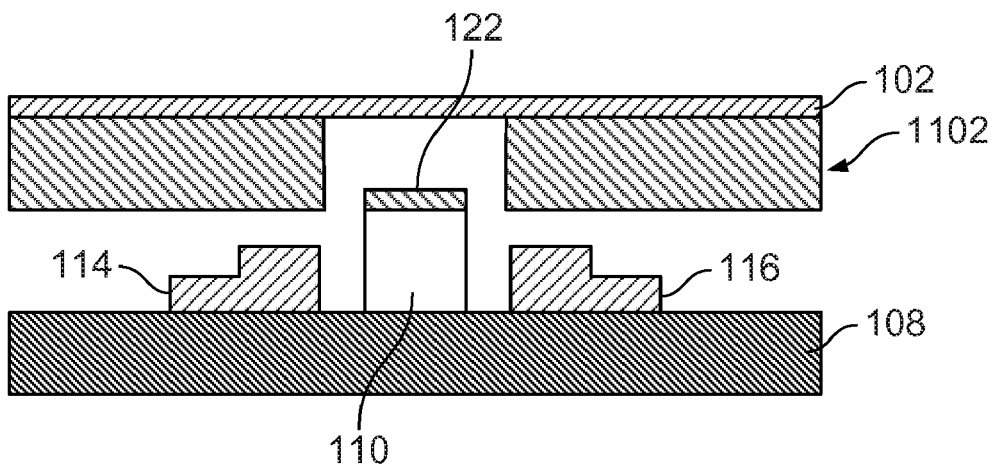

FIGS. 25-27 each show a partial cross section of an alternative implementation of the SLM cell depicted in FIGS. 1-3. The cross sections are taken along the same lines as those of cross section A-A (FIG. 1). The alternative implementation depicted in FIG. 25 includes components similar to those depicted inn FIG. 1, except for the middle layer. In particular, the middle layer 902 of the alternative implementation, unlike the middle layer 104, consists of two separate pieces 904 and 906 so that the recess 908, unlike recess 132, extends completely from the top surface of the bottom layer 106 to the bottom surface of the top layer 102. That is, the recess 908 is a channel that is as deep as the thickness of the middle layer 902 such that a portion of the bottom surface of the top layer 102 is exposed. With the implementation of FIG. 25, the top layer 102 can be made of a reflective metal such as Aluminum, the middle layer can be made of amorphous silicon or $TiN_x$, and the bottom layer can be made of a conductive material such as $TiN_x$.

With the implementation depicted in FIG. 26, the SLM cell includes a two-layer rather than a three-layer micro mirror. The hinge member is implemented in and is made of the same material as the bottom layer 1002. In this implementation, the top layer 102 can be made of a reflective material such as Aluminum, and the bottom layer 1002 can be made of amorphous silicon or $TiN_x$.

Like the implementation depicted in FIG. 26, the implementation depicted in FIG. 27 includes a two-layer rather than a three-layer micro mirror. However, unlike the bottom layer 1002, the bottom layer 1102 includes a recess that has a same depth as the thickness of the bottom layer so that a portion of the bottom surface of the top layer 102 is exposed. In this implementation, the top layer 102 can be made of a reflective material such as Aluminum, and the bottom layer 1102 can be made of amorphous silicon, $TiN_x$, or Ti.

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, a data processing apparatus. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Particular embodiments of the invention have been described. Other embodiments are within the scope of the following claims. For example, the actions recited in the claims can be performed in a different order and still achieve desirable results. A same 3-dimensional multi-layer structures may be constructed by patterning and etching the electromechanical layers, rather than patterning the sacrificial layers and etching via. Besides video displays and printing applications, the spatial light modulator described above is also useful in other applications, for example, in maskless photolithography, where the spatial light modulator directs light to develop deposited photoresist, and in photonic switches, where the optical signals are directed and distributed among fiber optical networks.

What is claimed is:

1. A spatial light modulator, a cell of which comprising:
a substrate portion;
a first support post and a second support post on the substrate portion, each of the first support post and second support post having a top surface; and
a micro mirror that includes a hinge member having a first end and a second end and a body supported by the hinge member, the first end and second end of the hinge member being secured to the top surface of the first support post and the second support post, respectively, wherein the hinge member and the support posts are completely hidden underneath the body of the micro mirror, the hinge member having a twistable portion configured to twist when the mirror is tilted and when the micro mirror is in a quiescent state, a bottom surface of the twistable portion of the hinge member is coplanar with a bottom surface of the body of the micro mirror.

2. The spatial light modulator of claim 1, wherein the micro mirror has a footprint over the substrate portion, and the support posts are situated within the footprint.

3. The spatial light modulator of claim 2, wherein the spatial light modulator includes multiple cells and a gap between adjacent cells does not accommodate a structure that supports the micro mirror.

4. The spatial light modulator of claim 3, further comprising:
a first electrode and a second electrode, each of which is situated on the substrate portion and connected to circuitry for addressing cells of the spatial light modulator.

5. The spatial light modulator of claim 4, wherein the electrodes are step electrodes.

6. The spatial light modulator of claim 1, wherein the support posts each has a cross section that is one of a circular, an oval, a square, a rectangular, a quadrilateral, or a triangular shape.

7. A spatial light modulator, a cell of which comprising:
a substrate portion;
a first support post and a second support post, each having a top surface;
a micro mirror that includes a binge member having a first end and a second end the first end and second end being secured to the top surface of the first support post and the second support post, respectively, wherein the hinge member and the support posts are completely hidden underneath the micro mirror; and
a hinge support frame situated on the substrate portion, the frame buttressing the support posts and retaining electrostatic potential within the cell.

8. A spatial light modulator, a cell of which comprising:
a substrate portion;

a first support post and a second support post each having a top surface; and a micro mirror that includes a hinge member having a first end and a second end, the first end and second end being secured to the top surface of the first support post and the second support post, respectively, wherein the hinge member and the support posts are completely hidden underneath the micro mirror, wherein the micro mirror has a top layer and a bottom layer that is adjacent to the top layer, and the hinge member is implemented in the bottom layer.

9. A spatial light modulator, a cell of which comprising:
a substrate portion;
a first support post and a second support post, each having a top surface; and
a micro mirror that includes a hinge member having a first end and a second end, the first end and second end being secured to the top surface of the first support post and the second support post, respectively, wherein the hinge member and the support posts are completely hidden underneath the micro mirror, wherein the micro mirror has a sandwich structure tat comprises a reflective top layer, a middle layer, and a bottom layer.

10. The spatial light modulator of claim 9, wherein the hinge member is implemented in the bottom layer.

11. The spatial light modulator of claim 10, wherein the hinge member runs either diagonal or orthogonal to edges of the micro mirror.

12. The spatial light modulator of claim 11, wherein the middle layer includes a recess configured to accommodate the hinge member so that the hinge member does not directly contact the middle layer when the micro mirror is tilted.

13. A method of making a spatial light modulator, the method comprising:
forming a control substrate with a substrate portion;
forming a first support post and a second support post on top of the substrate portion; and
forming a micro mirror having a hinge member about which the micro mirror is configured to tilt and a body supported by the hinge member, the hinge member being implemented in a bottom layer of the micro mirror, the binge member having a first end secured to a top surface of the first support post and a second end secured to a top surface of the second support post, wherein the support posts and micro mirror we formed so that the support posts and hinge member are completely hidden underneath the body of the micro mirror when the mirror is viewed from above the mirror, the hinge member has a twistable portion configured to twist when the mirror is tilted and when the micro mirror is in a quiescent state, a bottom surface of the twistable portion of the hinge member is coplanar with a bottom surface of the body of the micro mirror.

14. The method of claim 13, wherein forming the micro mirror includes:
forming a bottom layer that includes the binge member;
forming a middle layer that includes a recess configured to accommodate the hinge member when the micro mirror is tilted; and
forming a reflective top layer on the middle layer.

15. The method of claim 13, wherein the micro mirror has a footprint over the control substrate and the support posts are formed so as to be situated within the footprint.

16. The method of claim 13, further comprising:
forming a plurality of electrodes on the control substrate; and
forming a plurality of vertical landing tips on the control substrate.

17. The method of claim 16, wherein forming a plurality of electrodes includes forming step electrodes.

18. The method of claim 16, wherein forming a plurality of vertical landing tips includes forming vertical landing tips having a top horizontal member.

19. The method of claim 13, further comprising:
forming a hinge support frame to buttress the support posts, the hinge support frame being completely hidden underneath the micro mirror.

20. The method of claim 13, wherein the micro mirror is formed by deposition patterning, and planarizing of a material, wherein the material includes aluminum, titanium, tungsten, molybdenum, silicon, silicide, or polycide.

21. The method of claim 13, further comprising:
forming other micro mirrors.

22. The spatial light modulator of claim 9, wherein the micro mirror has a footprint over the substrate portion, and the support posts are situated within the footprint.

23. The spatial light modulator of claim 22, wherein the spatial light modulator includes multiple cells and a gap between adjacent cells does not accommodate a structure that supports the micro mirror.

24. The spatial light modulator of claim 23, further comprising:
a first electrode and a second electrode, each of which is situated on the substrate portion and connected to circuitry for addressing cells of the spatial light modulator.

25. The spatial light modulator of claim 24, wherein the electrodes are step electrodes.

26. The spatial light modulator of claim 9, wherein the support posts each has a cross section that is one of a circular, an oval, a square, a rectangular, a quadrilateral, or a triangular shape.

* * * * *

UNITED STATES PATENT AND TRADEMARK OFFICE
CERTIFICATE OF CORRECTION

| | |
|---|---|
| PATENT NO. | : 7,388,707 B2 |
| APPLICATION NO. | : 11/346803 |
| DATED | : June 17, 2008 |
| INVENTOR(S) | : Shaoher X. Pan |

It is certified that error appears in the above-identified patent and that said Letters Patent is hereby corrected as shown below:

On the Title page (63), Related U.S. Application Data, lines 2 and 3 replace:
"filed on Oct. 26, 2004, now Pat. No. 7,167,298, which is a..." with
-- filed on Oct. 26, 2004, now Pat. No. 7,167,298, and also a... --

Column 10, Line 57 at Claim 7; replace:
"a micro mirror that includes a binge member having a first" with
-- a micro mirror that includes a hinge member having a first --

Column 10, Line 58 at Claim 7; replace:
"end and a second end the first end and second end being" with
-- end and a second end, the first end and second end being --

Column 11, Line 1 at Claim 8; replace:
"a first support post and second support post each having" with
-- a first support post and second support post, each having --

Column 11, Line 22 at Claim 9; replace:
"mirror has a sandwich structure tat comprises a reflect-" with
-- mirror has a sandwich structure that comprises a reflect- --

Column 11, Line 42 at Claim 13; replace:
"mirror, the binge member having a first end secured to" with
-- mirror, the hinge member having a first end secured to --

UNITED STATES PATENT AND TRADEMARK OFFICE
CERTIFICATE OF CORRECTION

PATENT NO. : 7,388,707 B2
APPLICATION NO. : 11/346803
DATED : June 17, 2008
INVENTOR(S) : Shaoher X. Pan It is certified that error appears in the above-identified patent and that said Letters Patent is hereby corrected as shown below:

Column 11, Line 45 at Claim 13; replace:
        "wherein the support posts and micro mirror we formed" with
        -- wherein the support posts and micro mirror are formed --

Column 12, Line 3 at Claim 14; replace:
        "forming a bottom layer that includes the binge member:" with
        -- forming a bottom layer that includes the hinge member: --

Signed and Sealed this

Twenty-sixth Day of August, 2008

JON W. DUDAS
*Director of the United States Patent and Trademark Office*